United States Patent [19]

Lee

[11] Patent Number: 5,735,130
[45] Date of Patent: Apr. 7, 1998

[54] ICE REMOVAL MOTOR CONTROL CIRCUIT AND METHOD FOR AN AUTOMATIC ICE MAKER

[75] Inventor: Kun Bin Lee, Seoul, Rep. of Korea

[73] Assignee: Samsung Electronics Co., Ltd., Suwon, Rep. of Korea

[21] Appl. No.: 756,823

[22] Filed: Nov. 26, 1996

[30] Foreign Application Priority Data

Nov. 30, 1995 [KR] Rep. of Korea ............... 95-45707

[51] Int. Cl.$^6$ ................................................. F25C 1/00
[52] U.S. Cl. ........................... 62/71; 62/137; 62/126; 62/353
[58] Field of Search .................. 62/137, 135, 138, 62/66, 71, 72, 73, 353, 354, 342, 343, 344, 345, 346, 126, 128, 129, 130, 131, 140, 230; 318/474, 476

[56] References Cited

U.S. PATENT DOCUMENTS

| | | | |
|---|---|---|---|
| 2,846,633 | 8/1958 | Gingrich | 318/476 X |
| 4,123,792 | 10/1978 | Gephart et al. | 62/140 X |
| 4,426,851 | 1/1984 | Neumann | 62/126 |
| 5,172,556 | 12/1992 | Oike | 62/129 X |
| 5,400,605 | 3/1995 | Jeong | 62/353 X |

*Primary Examiner*—Harry B. Tanner
*Attorney, Agent, or Firm*—Burns, Doane, Swecker & Mathis, L.L.P.

[57] ABSTRACT

An ice removal motor control circuit and method for an automatic ice maker is provided, which ice maker includes a load voltage detector for detecting a load voltage applied across an ice removal motor, a comparator for comparing the load voltage with a predetermined reference voltage, and a controller for outputting a control signal to an ice removal motor controller to stop operation of the ice removal motor when the load voltage is larger than the reference voltage. Thus, an excessive load is prevented from being applied to the ice removal motor, thereby protecting the ice removal motor and relevant elements from being damaged and further improving reliability of the automatic ice maker.

5 Claims, 4 Drawing Sheets

ICE REMOVAL MOTOR CONTROL CIRCUIT AND METHOD FOR AN AUTOMATIC ICE MAKER

BACKGROUND OF THE INVENTION

The present invention relates to an ice removal motor control circuit and method for an automatic ice maker, and more particularly to an ice removal motor control circuit and method for an automatic ice maker which can prevent an ice removal motor and relevant components from being damaged due to occurrence of an excessive load.

A general automatic ice maker mounted in a freezing compartment of a refrigerator includes an ice tray for containing water to be made into ice, a water supply unit for supplying the water to the ice tray, an ice removal motor for rotating the ice tray, and an ice container installed below the ice tray for collecting ice.

In such an automatic ice maker, water is supplied to the ice tray by the water supply unit when the ice tray is in the horizontal position, prior to ice making. When ice making is completed, the ice tray is rotated by the ice removal motor, to separate the ice from the ice tray to be collected in the ice container. When the ice is separated from the ice tray, the ice tray is returned to the horizontal position for ice making, whereafter water is supplied and ice making is resumed. The amount of rotation in turning and returning the ice tray by the ice removal motor is controlled based on an amount of operational time. There are provided a return rotation stopper for stopping a return rotation of the ice tray to the horizontal position for an ice making, and a reverse rotation stopper for stopping an ice removal rotation of the ice tray to a reverse limit position, in order to control the reverse and return operations of the ice tray.

In such a conventional automatic ice maker, when a refrigerator is initially installed, or is reactivated after it has been deactivated owing to the failure of power supply or detachment of a power plug, an excessive load can be applied to the ice removal motor by continuous operation of the ice removal motor although the ice tray cannot rotate any more due to contact of the return rotation stopper or the reverse rotation stopper. When excessive water is supplied in the ice tray causing an excessive amount of ice to be obtained, an excessive load can be applied to the ice removal motor during the ice removal operation. The ice removal motor or elements in an ice removal motor controller can be damaged due to such excessive loads. According to such circumstances, mechanical elements in the automatic ice maker, such as the ice tray, can be broken.

SUMMARY OF THE INVENTION

To solve the above problem, it is an object of the present invention to provide an ice removal motor circuit and method for an automatic ice maker which prevent elements from being broken by controlling an operation of an ice removal motor according to an excessive load to the ice removal motor.

To accomplish the above object of the present invention, there is provided an ice removal motor control circuit for an automatic ice maker having an ice tray, an ice removal motor for rotationally reversing and returning the ice tray, and an ice removal motor controller for controlling a rotational direction of the ice removal motor, the ice removal motor control circuit comprising:

load voltage detection means for detecting a load voltage applied across the ice removal motor;

a comparator for comparing the load voltage with a predetermined reference voltage; and control means for outputting a control signal to the ice removal motor controller to stop operation of the ice removal motor when the load voltage is larger than the reference voltage.

There is also provided an ice removal motor control method for an automatic ice maker having an ice removal motor for reversing and returning the ice tray and an ice removal motor controller for controlling a rotational direction of the ice removal motor, the ice removal motor control method comprising the steps of:

detecting a load voltage applied across the ice removal motor;

comparing the load voltage with a predetermined reference voltage; and outputting a control signal to the ice removal motor controller to stop operation of the ice removal motor when the load voltage is larger than the reference voltage in the comparison step.

DETAILED DESCRIPTION OF THE PREFERRED EMBODIMENT

A preferred embodiment of the present invention will be described below in more detail with reference to the accompanying drawings.

Figure 1:
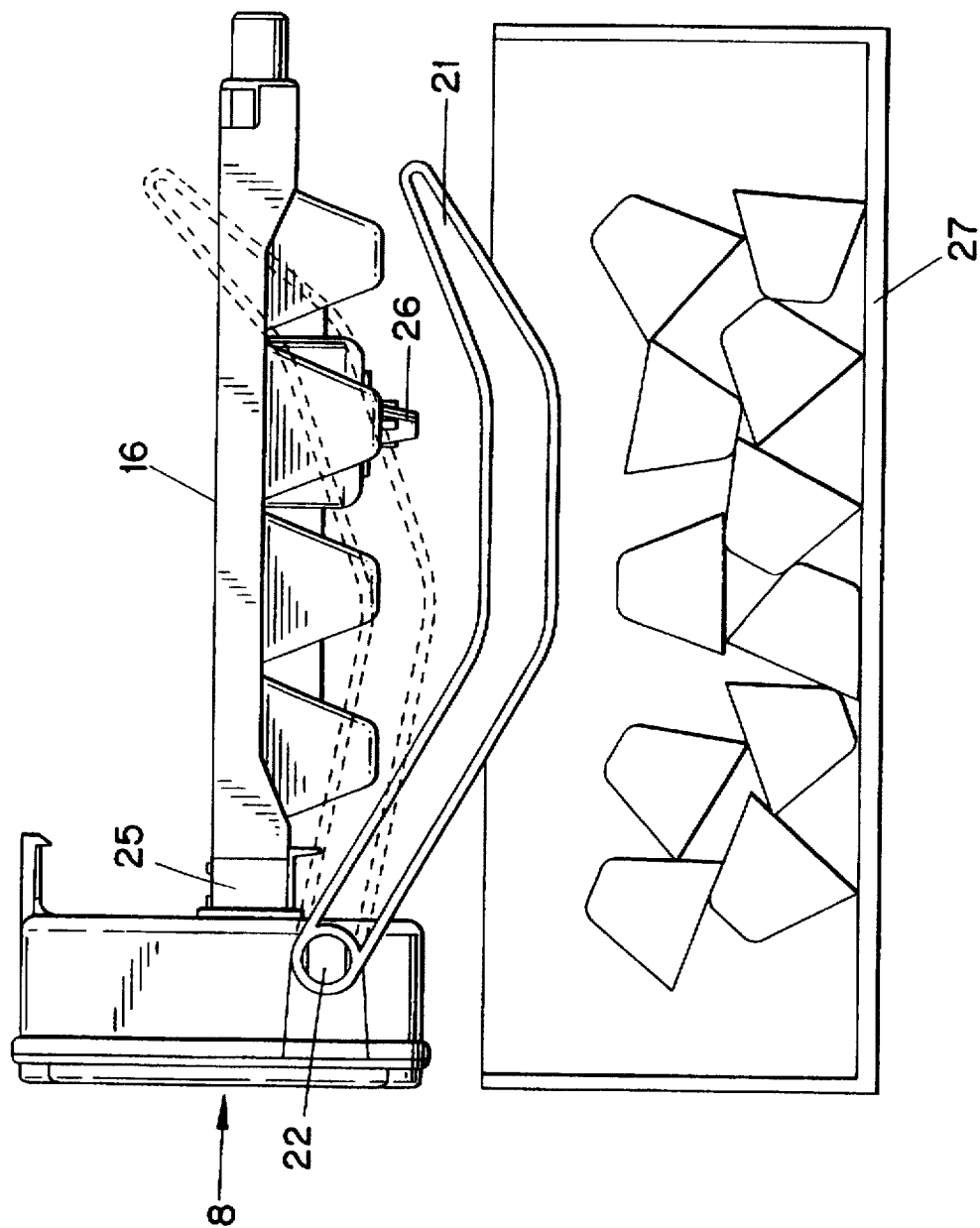
FIG. 1 is a front view showing essential elements of an automatic ice maker to which the present invention is applied.

FIG. 1 shows essential elements of an automatic ice maker to which the present invention is applied. An ice tray 16 for containing water to be made into ice is rotatably supported in a housing 8 via a tray rotational axis 25. An ice removal temperature sensor 26 is provided for generating a temperature signal to enable ice removal time by detecting a temperature on the ice tray 16. The sensor 26 is attached to the bottom of the ice tray 16. An ice container 27 for collecting ice separated from the ice tray 16 is provided below the ice tray. A full ice detection lever 21 is rotatably mounted in the housing 8 so that it can rotate centered at a full ice detection lever axis 22. The full ice detection lever 21 ascends and descends according to an amount of ice in the ice container 27. When the ice container 27 is full of ice, the full ice detection lever 21 ascends as shown as a dotted line in FIG. 1, to activate a full ice detection switch to inform a microprocessor (not shown) of the full ice state.

Figure 2:
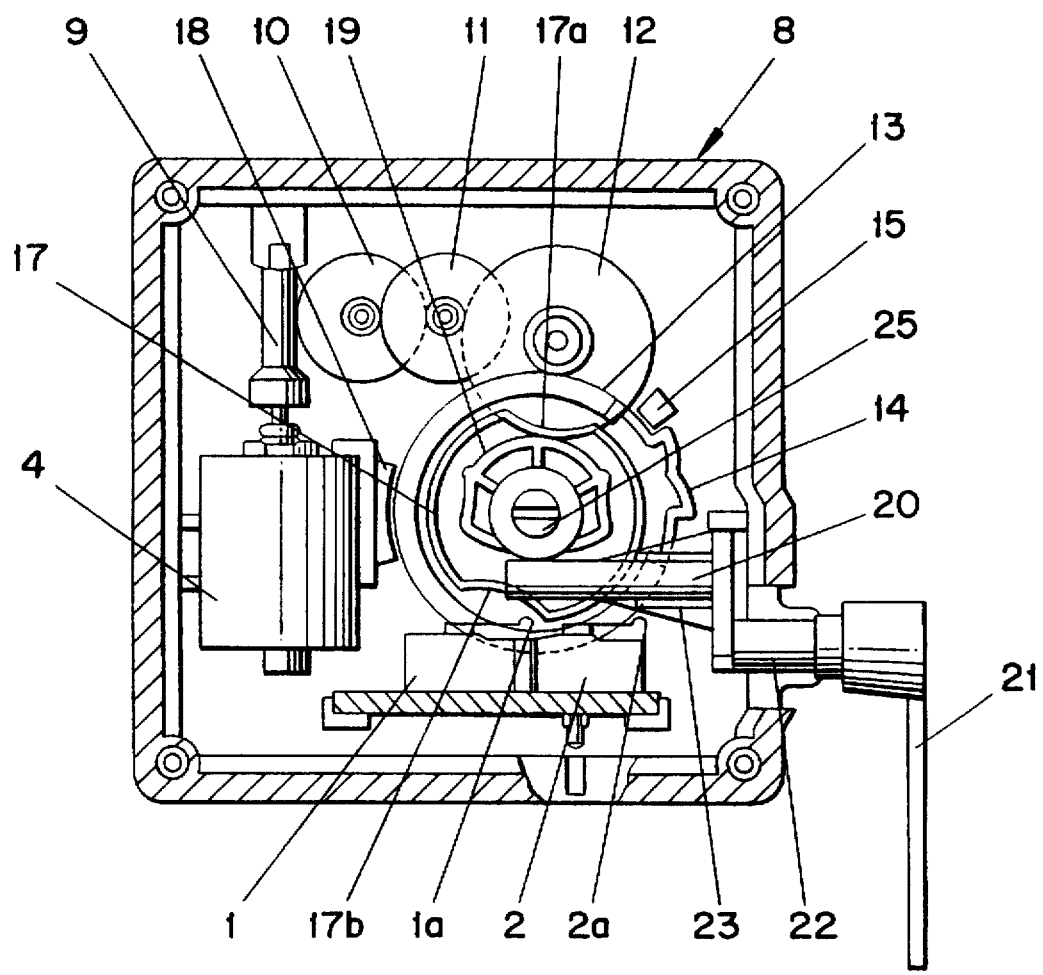
FIG. 2 is a side view showing an automatic ice maker to which the present invention is applied.

FIG. 2 is a side view showing an automatic ice maker to which the present invention is applied. A horizontal position detection switch 1 for detecting a horizontal position of the ice tray 16 and a full ice detection switch 2 for detecting as whether the ice container 27 is full of ice, are disposed in parallel in the housing 8. The horizontal position detection switch and the full ice detection switch 2 are composed of a micro-switch, respectively. The horizontal position detection switch 1 and the full ice detection switch 2 include switch levers 1a and 2a which operate by pressure applied from the upper direction. An ice removal motor 4 for enabling the ice tray 16 to rotate forward and backward is installed in one side of the housing 8. The ice removal motor 4 provides a decelerated rotational force to an end gear 13 via a deceleration gear train including a worm gear and first through third gears 10, 11 and 12. The tray rotational axis 25 is rotatably incorporated in the center of the end gear 13, to enable the ice tray 16 to rotate forward and backward.

A stop protrusion 14 rotatably incorporated with the rotational axis of the ice tray 16 is provided on the outer circumference of the end gear 13, in order to set the ice tray in an ice making horizontal position. The stop protrusion 14 contacts a return rotational stopper 15 provided to correspond to the ice making horizontal position of the ice tray 16, and to prevent the end gear 13 from rotating beyond the ice making horizontal position. The stop protrusion 14 also contacts a reverse rotational stopper 18 attached to the ice removal motor 4 to prevent the end gear 13 from excessively rotating in a reverse rotational direction.

A first detection cam 17 for detecting a horizontal position of the ice tray 16 together with the horizontal position detection switch 1, is incorporated in the end gear 13. The first detection cam 17 has a generally circular cam profile in which an ice making position detection groove 17a and a reverse position detection groove 17b are formed in the outer circumference of the cam 17 in correspondence to the ice making position and the reverse position, respectively. A switch lever 1a of the horizontal position detection switch 1 contacts the cam profile of the first detection cam 17. The switch lever 1a is actuated when it contacts a circular cam profile interval of the first detection cam 17, to activate the horizontal position detection switch 1, while the switch lever 1a is released when it contacts an interval corresponding to the ice making position detection groove 17a or the reverse position detection groove 17b, to deactivate the horizontal position detection switch 1.

Figure 3:
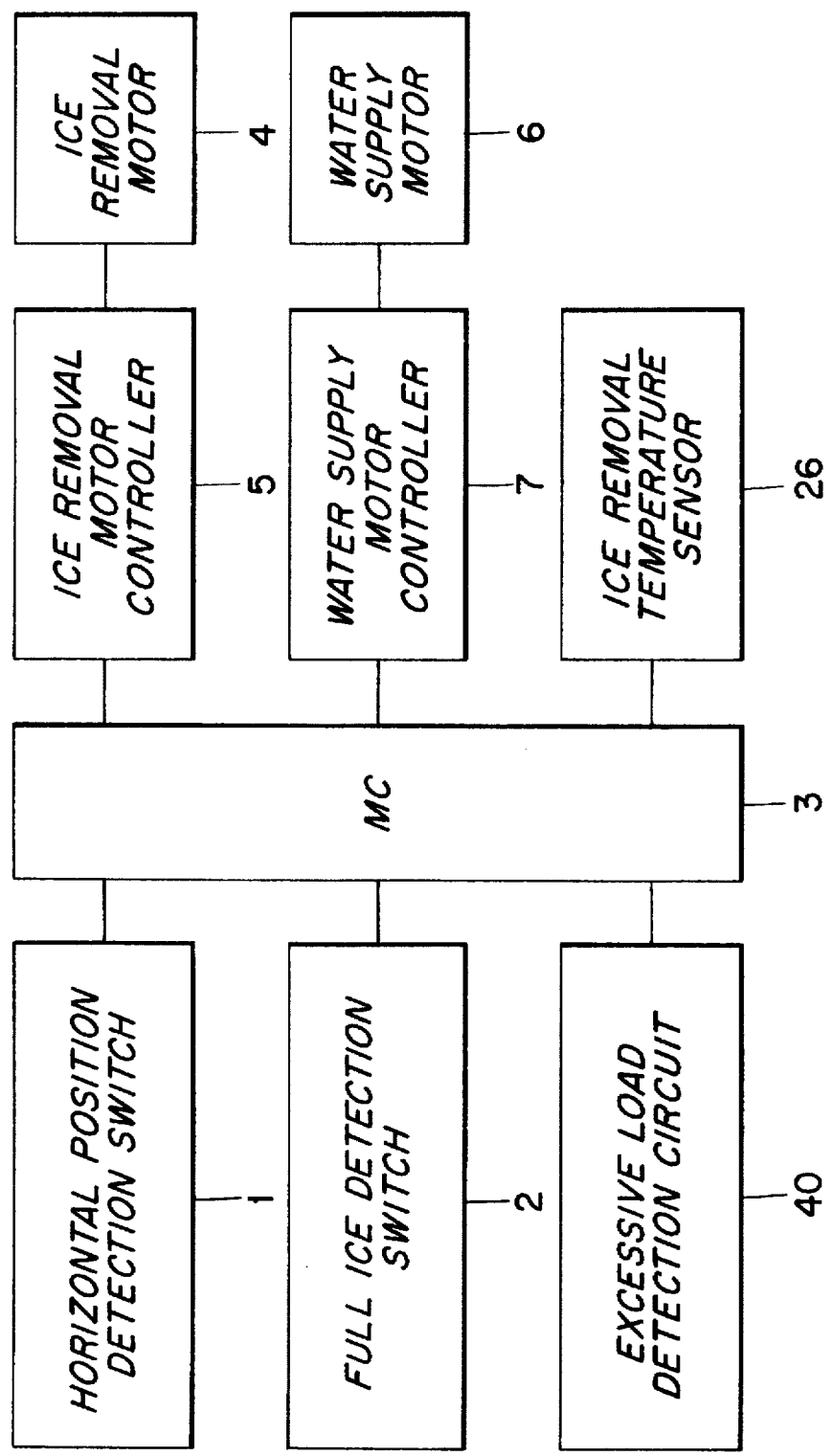
FIG. 3 is a schematic block diagram of a control system for the automatic ice maker to which the present invention is applied.

A second detection cam 19 is rotatably installed in addition to the first detection cam 17 along with the rotation of the end gear 13. The second detection cam 19 has a smaller radius of curvature in the circumference opposing the ice making position detection groove 17a, and has a larger radius of curvature in the circumference opposing the reverse position detection groove 17b. A function arm 20 contacts the cam profile of the second detection cam 19. The function arm 20 ascends and descends according to rotation of the second detection cam 19. The function arm 20 is eccentrically installed in the full ice detection lever axis 22 of the full ice detection lever 21. Accordingly, the full ice detection lever 21 ascends and descends according to the ascending and descending of the function arm 20, and vise versa. If the function arm 20 descends, a function rib 23 provided on the surface of the function arm 20 acts on the switch lever 2a of the full ice detection switch 9 to activate the full ice detection switch 2. Thus, the full ice detection switch 2 is activated by movement of the function arm 20 due to the rotation of the second detection cam 19 as well as by movement of the full ice detection lever 21 due to the full state of the ice container 27 of FIG. 1. When an excessive load is applied across the ice removal motor due to power failure or capacity of the ice container in the automatic ice maker shown in FIGS. 1 and 2, a method for protecting the ice removal motor from the excessive load is proposed. FIG. 3 is a schematic block diagram of a control system for the automatic ice maker to which the present invention is applied. A microcomputer 3 acting as a controller receives signals from the horizontal position detection switch 1, the full ice detection system 2 and the ice removal temperature sensor 26, and controls the ice removal motor 4 via the ice removal motor controller 5, and controls the water supply motor 6 via the water supply motor controller 7. Also, the microcomputer 3 receives a signal from an excessive load detection circuit 40.

When the stop protrusion 14 of the end gear 13 contacts the return rotational stopper 15, the excessive load detection circuit 40 detects an excessive load, that is, a return rotational stop load to provide the same to the microcomputer 3. The microcomputer 3 determines whether the ice tray 16 is in the ice making horizontal position based on the received signal and stops operation of the ice removal motor 4. At the same time, the excessive load detection circuit 40 detects an excessive load, that is, a reverse rotational stop load and provides the same to the microcomputer 3, when the stop protrusion 14 contacts a reverse rotational stopper 18. The microcomputer 3 stops a reverse rotational operation of the ice removal motor 4 based on the received signal.

Figure 4:
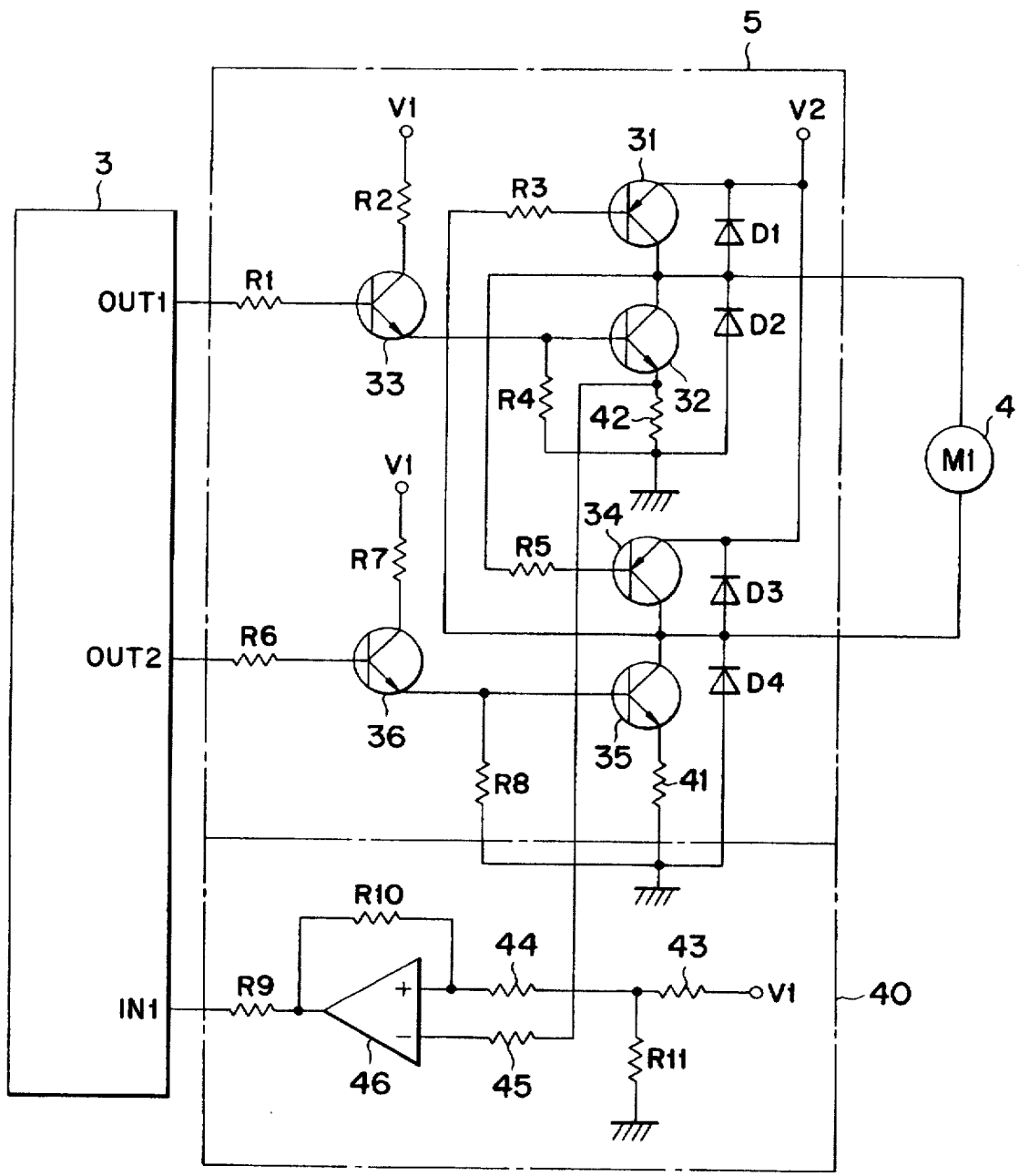
FIG. 4 is a detailed circuit diagram showing the ice removal motor controller and the excessive load detection circuit shown in FIG. 3.

FIG. 4 is a detailed circuit diagram showing the ice removal motor controller 5 and the excessive load detection circuit 40 shown in FIG. 3. The ice removal motor controller 5 includes first through fourth switching transistors 31, 32, 34 and 35 for properly switching a drive voltage v2 supplied from a drive power source and controlling a rotational direction of the ice removal motor 4, and a pair of control transistors 33 and 36 for controlling the switching operations of the first through fourth switching transistors 31, 32, 34 and 35 by being switched according to a control signal output from the microcomputer 3. The second and fourth switching transistors 32 and 35 among the switching transistors 31, 32, 34 and 35 can switch the ice removal motor 4 to ground, while the first and third switching transistors 31 and 34 can switch the drive power source to the ice removal motor 4.

Thus, there are two kinds of power supply lines for the ice removal motor 4. One is a first power supply line passing through the drive power source, the first switching transistor 31, the ice removal motor 4, the fourth switching transistor 35, a resistor 41 and the ground, and the other is a second power supply line passing through the drive power source, the third switching transistor 34, the ice removal motor 4, the second switching transistor 32, a resistor 42 and the ground. The two power supply lines provide mutually opposite drive voltages to the ice removal motor 4 to drive the ice removal motor 4 forward or backward.

In the above-constructed ice removal motor controller 5, if logic "low" signals are output from first and second output terminals OUT1 and OUT2 of the microcomputer 3 and are applied to bases of the control transistors 33 and 36. The NPN type control transistors 33 and 36 are turned off. According to the turning of the control transistors 33 and 36, a constant voltage v1 provided in each collector is interrupted. Accordingly, the bases of the switching transistors 32 and 35 toward the ground come to the logic "low" states. When the bases are in the logic "low" states, the NPN type switching transistors 32 and 35 are turned off to interrupt the two power supply lines. As a result, the drive voltage V2 is not supplied to the ice removal motor 4 thereby stopping the ice removal motor 4. Next, if a logic "low" signal is output from the first output terminal OUT1 of the microcomputer 3 and a logic "high" signal is output from the second output terminal OUT2 to the bases of the corresponding control transistors 33 and 36, the first control transistor 33 is turned off and the second control transistor 36 is turned on. According to the turning off of the first control transistor 33, a constant voltage V1 supplied to the collector thereof is interrupted by the first control transistor 33. Accordingly, the base of the second switching transistor 32 comes to the logic "low" state. As a result, the second switching transistor 32 is turned off, to interrupt the second power supply line including the second switching transistor 32. If the second control transistor 36 is turned on, a constant voltage V1 is applied to the base of the fourth switching transistor 35. The NPN type fourth switching transistor 35 is turned on, to accordingly change the level of the collector of the fourth switching transistor 35 to the ground level. At the same time, the potential of the base of the first switching transistor 31 goes to the logic "low" state. Since the first switching transistor 31 is an PNP type transistor, the first transistor is turned on if the potential of the base thereof is low. Accordingly, a first power supply line passing through the drive power source, the first switching transistor 31, the ice removal motor 4, the fourth switching transistor 35, a resistor 41 and the ground, is formed. Therefore, the drive voltage V2 provided from the drive power source enables the ice removal motor 4 to rotate in a certain direction, for example, in a reverse direction for ice removal.

Meanwhile, if a logic "high" signal is output from the first output terminal OUT1 of the microcomputer 3 and the logic "low" signal is output from the second output terminal OUT2 thereof, and applied to the bases of the corresponding control transistors 33 and 36, the first control transistor 33 is turned on and the second control transistor 36 is turned off. According to the turn-off of the second control transistor 36, a constant voltage V1 provided in the collector thereof is interrupted. Accordingly, the base of the fourth switching transistor 35 comes to the logic "low" state. As a result, the fourth switching transistor 35 is turned off, to interrupt the first power supply line including the fourth switching transistor 35. If the first control transistor 33 is turned on, a constant voltage V1 is applied to the base of the second switching transistor 32, the second switching transistor 32 is turned on, to accordingly change the level of the collector of the second switching transistor 32 to ground level. At the same time, the potential of the base of the third switching transistor 34 goes to a logic "low" state. Since the third switching transistor 34 is a PNP type transistor, the third switching transistor 34 is turned on if the potential of the base thereof is low. Accordingly, a second power supply line connected through the drive power source, the third switching transistor 34, the ice removal motor 4, the second switching transistor 32, a resistor 42 and the ground, is formed. Therefore, the drive voltage V2 provided from the drive power source enables the ice removal motor 4 to rotate in an opposite direction to the above-described direction, for example, in a return direction for returning the ice tray after ice removal.

Meanwhile, the excessive load detection circuit 40 includes a current detection resistor 41 which is connected to the emitter of the fourth switching transistor 35, for detecting a voltage across the ice removal motor 4 when the ice removal motor 4 rotates forward, that is, a load voltage. A current detection resistor 42 is connected to the emitter of the second switching transistor 32, for detecting a voltage across the ice removal motor 4 when the ice removal motor 4 rotates backward. Also included are a pair of voltage dividing resistors 43 and 44 for dividing the received constant voltage V1 into a predetermined reference voltage. The load voltage detected by the current detection resistors 41 and 42 is input to an inverting end of a comparator 46 and the reference voltage obtained via the two voltage dividing resistors 43 and 44 is input to a non-inverting end of the comparator 46, to be compared with each other. The comparison result in the comparator 46 is supplied to an input end IN1 of the microcomputer 3.

Since the ice removal motor 4 is selectively driven in only one direction between the forward rotation and the reverse rotation, one of the detected load voltages output from the current detection resistors 41 and 42 is input to the inverting end of the comparator 46. The reference voltage value is a voltage value corresponding to the maximum load allowable for the ice removal motor 4, which should not exceed the detected load voltage.

According to the above-described construction of the excessive load detection circuit 40, if the ice removal motor rotates forward or backward, a drive current proportional to the drive voltage V2 flows in the ice removal motor 4. This current is converted into a predetermined load voltage value corresponding to the motor load by the current detection resistors 41 and 42 and the resistor 45 and the converted load voltage value is input to the inverting end of the comparator 46. The load voltage input to the comparator 46 is compared with the reference voltage input to the non-inverting end thereof via the voltage dividing resistors 43 and 44.

When the load voltage is smaller than the reference voltage, that is, when a load applied across the ice removal motor 4 is within an allowable range, a logic "high" signal is input to an input terminal IN1 of the microcomputer 3 from the comparator 46. The microcomputer 3 determines that the ice removal motor 4 is operating normally without having an excessive load according to the input signal from the comparator 46.

If an excessive load is applied across the ice removal motor 4, for example, when a distortion load is too large due to an excessive amount of the ice made in ice tray 16, or the stop protrusion 14 contacts the return rotational stopper 15 or the reverse rotational stopper 18 during the return or reverse operation of the ice tray 16, the detected load voltage increases and the load voltage exceeds the reference voltage. Then, the comparator 46 outputs a logic "low" signal to input the same to the microcomputer 3. Then, the microcomputer 3 recognizes that an excessive load is applied across the ice removal motor 4, and then outputs the logic "low" signals via the two output terminals OUT1 and OUT2 to stop operation of the ice removal motor 4.

Thus, if an excessive load is applied across the ice removal motor 4, the ice removal motor 4 is automatically stopped. Accordingly, damage of the ice removal motor 4 or the breakage of the relevant elements due to the excessive load can be prevented. In FIG. 4, R1 through R11 are bias resistors and D1 through D4 are diodes for preventing counter-flow of the current.

The microcomputer 3 which outputs a control signal for interrupting the operation of the ice removal motor 4 according to an excessive load detection signal output from the excessive load detection circuit 40 combines the signals output from the horizontal position detection switch 1 and/or the full ice detection switch 2, to properly control the ice removal motor 4. For example, when the ice removal motor 4 is rotationally returned and reaches an ice making horizontal position, an excessive load is indicated by the excessive load detection circuit 40, since the stop protrusion 14 of the ice tray 16 is latched to the return rotational stopper 15, the operation of the ice removal motor 4 is stopped and then a water supply operation and an ice making operation is performed in turn. Also, when an excessive load occurs during a reverse operation of the ice tray 16 for ice removal, a distortion load of the ice tray 16 may be too large, Accordingly, a counter-measure such as backward-rotation of the ice removal motor 4 can be taken. According to the necessity, an alarm can be generated via an alarm (not shown).

As described above, the present invention can prevent an excessive load from being applied to the ice removal motor, to thereby protect the ice removal motor and the relevant elements from be damaged and improve reliability of the automatic ice maker.

What is claimed is:

1. An ice removal motor control circuit for an automatic ice maker having an ice tray, an ice removal motor for rotating the ice tray to thereby remove ice, and an ice removal motor controller for controlling a rotational direction of the ice removal motor, the ice removal motor control circuit comprising:

load voltage detection means for detecting a load voltage applied across said ice removal motor;

a comparator for comparing the load voltage with a predetermined reference voltage; and control means for outputting a control signal to said ice removal motor controller to stop operation of said ice removal motor when the load voltage is larger than the reference voltage.

2. The ice removal motor control circuit according to claim 1, wherein said ice removal motor controller comprises:

switching transistor means for controlling a rotational direction of said ice removal motor by switching a drive voltage; and control transistor means which is switched according to the control signal output from said control means to control a switching operation of said switching transistor means.

3. The ice removal motor control circuit according to claim 2, wherein said switching transistors means comprises first through fourth switching transistors and wherein said drive voltage is driven by a switching operation of said control transistor means along a first power supply line passing through: the drive power source, the first switching transistor, the ice removal motor, the fourth switching transistor, a resistor connected to an emitter of the fourth switching transistor and the ground; and a second power supply line passing through: the drive power source, the third switching transistor, the ice removal motor, the second switching transistor, a resistor connected to an emitter of the second switching transistor and the ground; to thereby determine a rotational direction and an interruption time of said ice removal motor.

4. An ice removal motor control method for an automatic ice maker having an ice removal motor for rotating an ice tray, and an ice removal controller for controlling a rotational direction of the ice removal motor, the ice removal motor control method comprising the steps of:

detecting a load voltage applied across the ice removal motor;

comparing the load voltage with a predetermined reference voltage; and

5. A motor control apparatus for an ice removal motor, the apparatus comprising:

means for detecting a load amount corresponding to operation of the ice removal motor;

means for comparing the load amount with a reference load amount; and means for stopping operation of the ice removal motor in the event that the load amount is greater than the reference load amount.

* * * * *